UNITED STATES PATENT OFFICE.

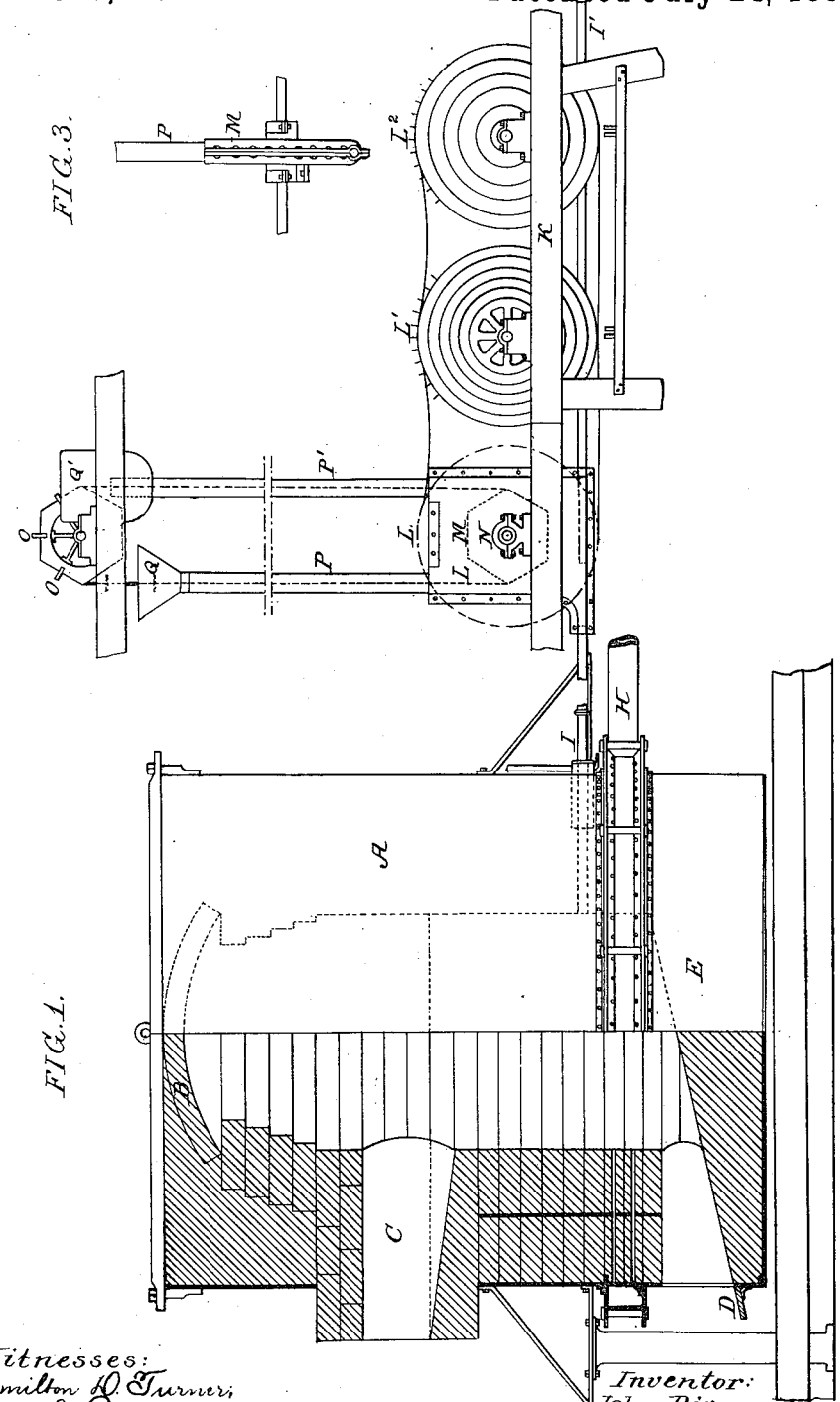

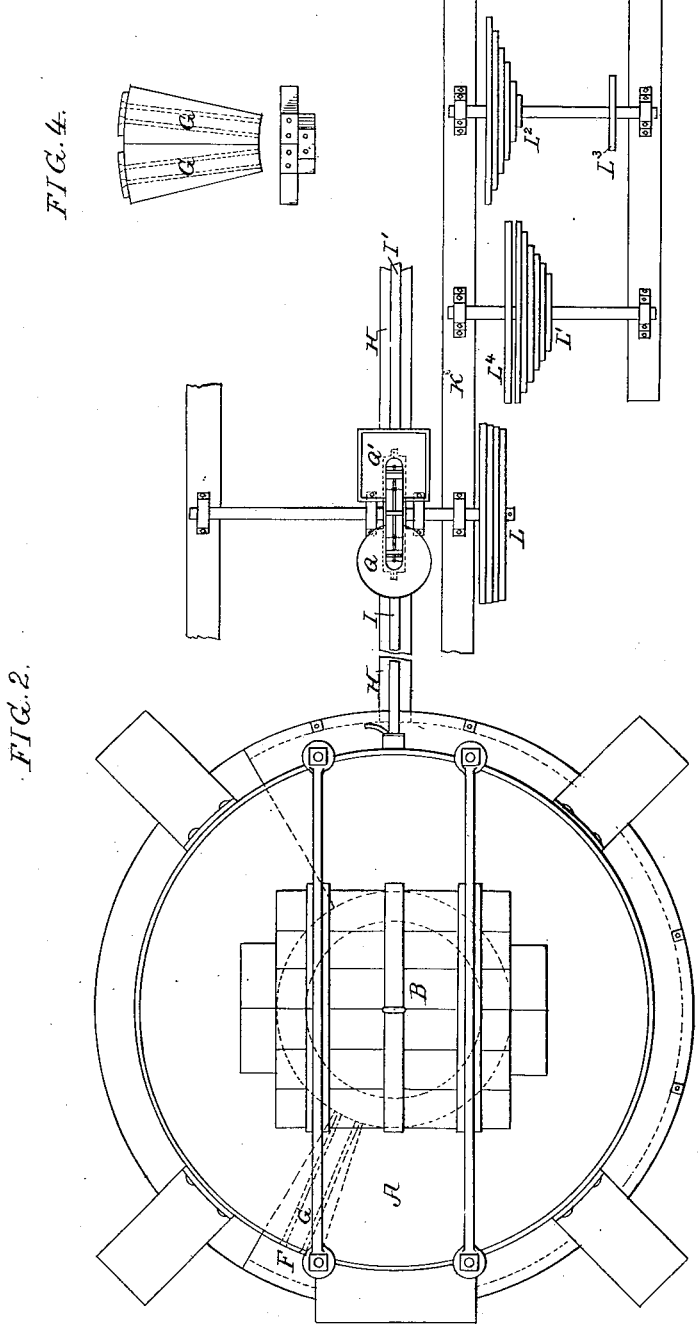

JOHN DIXON, OF ADELAIDE, SOUTH AUSTRALIA, ASSIGNOR OF FOUR-FIFTHS TO FREDERICK JAMES BLADES, WILLIAM SELBY DOUGLAS, DAVID GARLICK, AND WILLIAM MALCOLM, OF SAME PLACE.

PROCESS OF SMELTING PYRITES.

SPECIFICATION forming part of Letters Patent No. 386,629, dated July 24, 1888.

Application filed October 19, 1885. Serial No. 180,324. (No model.) Patented in England September 8, 1885, No. 10,621; in South Australia September 19, 1885, No. 601; in New South Wales September 21, 1885, No. 9,668, and in France December 29, 1885, No. 173,972.

*To all whom it may concern:*

Be it known that I, JOHN DIXON, a subject of the Queen of Great Britain, residing at Adelaide, in the Province of South Australia, accountant, have invented a certain Improved Process of Smelting Pyrites, (for which I have obtained a patent in South Australia, No. 601, dated September 19, 1885; in New South Wales, No. 9,668, dated September 21, 1885; in Great Britain, No. 10,621, dated September 8, 1885, and in France, No. 173,972, dated December 29, 1885,) of which the following is a full, clear, and exact description.

My invention relates especially to the smelting of copper pyrites; but modifications of the process and appliances will adapt it to other sulphureted ores. The furnaces made use of are those in which a high-pressure blast is blown directly through the melted sulphides to be treated. In combination with such furnaces, by means of a hot blast and the apparatus hereinafter described, whereby raw pyrites in a fine powder are delivered into the body of the melted charge at a point below the surface-level, and near the bottom thereof, I am enabled to maintain the necessary heat and to continue the reduction of the ore without further fuel.

I am aware that methods have been devised for treating a regulus in a similar manner; but I claim as an essential part of my invention the direct introduction of raw pyrites in the furnace for the purpose of producing a like effect, and thus rendering preliminary fusion unnecessary.

I first proceed to describe the furnace made use of; secondly, the appliances whereby the crushed ore is fed into the melted charge and the supply of the same regulated as may be required; and, thirdly, the process of smelting by the use of the foregoing.

By reference to the accompanying drawings it will be seen that Figure 1 is a side elevation of the furnace and feeding apparatus, the former being shown in quarter-section; Fig. 2, a plan of the same; Fig. 3, an end elevation of the feed-box; Fig. 4, a plan of the tuyere-bricks together with an end elevation of the same.

A, Figs 1 and 2, is the main body of a blast cupola-furnace supported on four pillars with suitable foundations; B, an arched cover composed of bricks clamped together, and, for convenience, removable in sections, the outer ones being securely attached to the walls of the furnace by cross-bars bolted thereto; C, the upper tap-hole projecting under a hood, and always open for the purpose of allowing the slag and gases to escape; D, the lower tap-hole, from which the reduced metal is run; E, the lower part of the furnace, secured to A by means of bolts passed through projecting flanges provided for the purpose.

Rails may be placed underneath E, whereon it drops when removed for repairs.

Between the flanges and reaching round about two-thirds of the circumference of the furnace is a removable circular channel, F, which supplies the blast to the tuyeres G. The lower flange should be fixed to the bottom E before the channel F is secured in its place.

G are bricks pierced with two parallel tuyeres of suitable size. Oblong holes are cut in the furnace-casing to correspond with the projections on the outside of the tuyere-bricks G, the relative position of three such holes being shown in Fig. 4. Two rows of G are usually made use of, and so arranged that the upper surface of the top row is in line, or nearly so, with the upper edge of E. All joints are to be filled with moist fire-clay.

H is the main blast-pipe leading from a suitable blast-engine into the channel F, which it supplies with cold air.

I is the feed-pipe connected by air-tight joints with the water-tuyere built into the side of the furnace A at a suitable distance above the blast-tuyeres G at a sufficient distance below the usual surface level and near the bottom of the molten charge to prevent chilling of the slag. The feed-pipe I, as also the water-tuyere, should be of hard metal, and for the size of furnace indicated should have a bore of about one and a quarter inch, though I do not confine myself to any particular size.

I' is the feed-blast pipe, forming a branch from the main blast and led through a suitable furnace or other source of heat.

K is a portion of the main frame-work of the feeding apparatus provided with suitable bearings, in which revolve the spindles of the sets of chain-wheels L L' L². These wheels are of various sizes, and are driven by flat-linked iron chains in the usual manner. The four wheels composing L may be of the respective circumferences 70 67 64 61 links of the chain; L' may be 70, 58, 50, 44, 38, and 35 links, and those composing L², 70, 58, 47, 35, 23, and 11 links. L³ is a fixed pulley connected with the engine by a similar chain. I wish it to be distinctly understood that I do not confine myself to these proportions, but consider them as applicable to the purpose I have in view, which is to increase or decrease at pleasure the quantity of ore fed into the furnace.

The spindles of the system L² and L³ are square, and suitable notched levers are provided, whereby those on spindle L² can be removed separately backward and forward. The wheels L³ are fixed, L⁴ being the only movable one on that spindle. The rests only of these levers are shown, as their construction is of any usual character.

M is the feed-box, Figs. 1 and 3, into which project the feed-pipe I and the feed-blast pipe I', as shown. To prevent radiation of heat, I protect where exposed I and I' by means of asbestus or other suitable covering. The feed-box M is provided with a trumpet-shaped mouth, Fig. 1, and is constructed, as shown, of two parts firmly bolted together.

N N' are two sexagonal wheels, having suitable recesses cast in their rims for the reception of the feed-disks O. N revolves inside the feed-box M in suitable bearings provided with internal stuffing-boxes filled with asbestus or other incombustible packing. N is attached to the spindle of the wheels L, Fig. 2, which also forms the main shaft of any ordinary elevator, whereby the crushed ore can be raised into the feed-hopper. The aggregate contents of the elevator-cups should be equal to the capacity of the pipe P, so that the supply and discharge may be practically equal. N revolves in bearings supported by any suitable frame-work. This I do not think it necessary to show or describe.

P P' are two pipes of hard steel secured in air-tight bosses in M.

O are the feed-disks constructed of hard steel and of such size as to pass easily through the pipes P P'. The disks O are linked together in an endless chain at such distances apart as shall correspond with the recesses in N N'.

Q Q' are two hoppers attached to the pipes P P' for the purposes hereinafter indicated. The pipe P should be continued some distance into Q', as shown, for the purpose hereinafter mentioned.

The action of the feeder is as follows: On its being thrown into gear the elevator delivers from time to time into the hopper Q the crushed ore in such quantity as will fill the space between two of the disks O. As the sexagonal disk N revolves, the ore is drawn by the disks O down the pipe P into the feed-box M, and driven into the furnace through the feed-pipe I by the hot blast at a temperature below its fusing-point. The disks O ascend the pipe P' empty, and may carry with them a small quantity of dust, which is collected in the hopper Q', from which it is removed, as necessary. By shifting the chain on the sets of wheels L L² the number of revolutions of N, and consequently the quantity of ore delivered into the feed-box M, can be regulated at pleasure. The proportions are so arranged, as described, that when the fixed engine-pulley L³ is running thirty revolutions per minute and the smallest wheel or pulley of L² is connected with the largest of L' and L⁴ with L, the sexagonal disk N will make five revolutions per minute and discharge about forty-seven pounds of ore into the feed-chamber M. By the graduated system of wheels indicated this quantity may be increased to about one hundred and ten pounds by suitably varying the gear.

My method of smelting copper pyrites is as follows: The ore is just reduced to a dry fine powder. If this is found to contain too much basic matter to yield a sufficiently fluid slag, clean mundic is added in such quantity as that the iron contained in it then forms a slag of the required fluidity. The furnace before described is heated in the usual manner, care being taken to close the top B and temporarily block up the tap-hole C until sufficient blast comes through the lower tap, D, to thoroughly heat the lower part of the furnace E. The lower tap, D, is then closed, and a charge of ore, or ore and mundic in small lumps, introduced through the movable top B. When by the application of the blasts a bath of melted metal has been obtained, the feeder is cautiously started and the quantity of ore fed into the furnace gradually increased until the slag runs from the tap C. That which comes after the regulus has been got up to about sixty per cent., for copper generally contains that metal, and is put aside for further treatment. When it is estimated that seventy-five per cent. is reached, the feeder is stopped and the reduction completed with the air-blasts alone. After the lapse of a sufficient time rough copper is run from the tap D, care being taken that in so doing the furnace charge is not allowed to fall below the aperture of the feeding-tuyere I. As soon as it approaches this, D is closed and the feeder cautiously started a second time. The wheels of the feeding apparatus are arranged in such gradations that the shifting the chain from the one wheel to another on the shaft L will, speaking roughly, be equal to the alteration in delivery of half a pound of ore per minute. This, it is estimated, is what is required by an alteration of four degrees of Fahrenheit's thermometer, or twenty-seven one-hundredths of an inch of the barometer. These instruments are placed in a convenient position, so that atmospheric disturbances can be roughly adjusted as they arise, it being found that the higher the barometer or the lower the thermometer the greater the quantity of ore required. No greater pressure is to be used in the blasts than is just sufficient to overcome the resistance of the furnace charge, as excess of blast means excess of splash. It will be found in practice that this resistance is less at the beginning than at the end of the process. Duplicate furnaces of an internal diameter of about thirty inches to be used alternately are here contemplated, as also a blowing-engine capable of discharging at least two thousand cubic feet of common air per minute at a pressure of about seven (7) pounds per square inch. I wish it to be clearly understood, however, that I do not confine myself to any special size or to the exact details of the process, as I am aware that it can be considerably varied without interfering with its special features. When it is required to renew the tuyere-bricks, the lower part of the furnace E is removed by loosening the bolts, as before described. The bricks themselves from their position, form, and method of attachment can then be easily replaced.

It will be seen, therefore, that I introduce the pyrites by means of the blast into the body of the molten metal at a point considerably below the top level of the charge, and, in fact, near the bottom of the same, so that the surface of the slag is not cooled. Furthermore, I introduce no fuel, as such, into the body of the metal, for the sulphur of the pyrites supplies all the fuel which the ore requires, and by this means I effect a great saving. It will be seen that in my invention there is used a blast separate from the ordinary blast for forcing in the crushed ore, and by the use of the traveling feed-chain and the adjustable driving mechananism therefor, in connection with the feed blast-pipe, I can insure the supply of ore in the required regulated quantities, and that without any danger of the blast forcing the ore back into the supply-pipe and choking it up.

I claim as my invention—

1. The process herein described of smelting pyrites in air-blast furnaces, said process consisting in introducing crushed raw ore without fuel into the body of the molten metal by an air-blast at a point below the surface-level, near the bottom of the molten charge, as and for the the purpose set forth.

2. The process herein described of smelting pyrites in air-blast furnaces, said process consisting in feeding crushed raw ore without fuel into the blast-pipe at a regulated speed, blowing such ore without fuel into the body of the molten metal by the air-blast at a point below the surface level and near the bottom of the melted charge, all substantially as set forth.

In testimony whereof I have signed my name to this specification in the presence of two subscribing witnesses.

JOHN DIXON.

Witnesses:
FRANCIS HUGH SNOW,
JOHN EDWIN JEFFREYS.